(12) United States Patent
Lai

(10) Patent No.: US 8,342,964 B2
(45) Date of Patent: Jan. 1, 2013

(54) HANDHELD CONTROLLER WITH GAS PRESSURE DETECTING MEMBERS AND GAME APPARATUS USING SAME

(75) Inventor: Cheng-Yi Lai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 291 days.

(21) Appl. No.: 12/685,050

(22) Filed: Jan. 11, 2010

(65) Prior Publication Data
US 2010/0317441 A1    Dec. 16, 2010

(30) Foreign Application Priority Data
Jun. 16, 2009   (CN) ................... 2009 1 0303283

(51) Int. Cl.
*A63F 13/02* (2006.01)
(52) U.S. Cl. ............................... 463/37; 463/39
(58) Field of Classification Search ............ None
See application file for complete search history.

(56) References Cited

U.S. PATENT DOCUMENTS

| | | | |
|---|---|---|---|
| 6,417,837 B1 * | 7/2002 | Baba | 345/157 |
| 2003/0193572 A1 * | 10/2003 | Wilson et al. | 348/207.99 |
| 2006/0107824 A1 * | 5/2006 | Bando et al. | 84/616 |
| 2009/0093304 A1 * | 4/2009 | Ohta | 463/36 |
| 2010/0225535 A1 * | 9/2010 | Li | 342/357.34 |

* cited by examiner

*Primary Examiner* — Melba Bumgarner
*Assistant Examiner* — George Howarah
(74) *Attorney, Agent, or Firm* — Altis Law Group, Inc.

(57) ABSTRACT

An exemplary handheld controller includes a shell, a gas pressure detecting member and a processing unit. The gas pressure detecting member is received in the shell and exposed to the ambient environment. The gas pressure detecting member is configured for detecting a pressure exerted by ambient air at the outside of the shell, and generating a signal relating to the pressure. The processing unit is electrically connected with the pressure detecting member. The processing unit is configured for receiving the signal, identifying a movement of the shell according to the signal, and generating an instruction based on the identified movement.

1 Claim, 5 Drawing Sheets

HANDHELD CONTROLLER WITH GAS PRESSURE DETECTING MEMBERS AND GAME APPARATUS USING SAME

BACKGROUND

1. Technical Field

The present disclosure relates to a handheld controller and a game apparatus using the handheld controller.

2. Description of Related Art

Electronic simulated activity games are well known in the art, and have been developed in a variety of forms. An electronic game apparatus generally includes a host computer in communication with a display, such as a monitor or a home-use TV receiver, and a game controller in communication with the host, for performing various playing operations.

A game apparatus is disclosed in the U.S. Pub. No. 2008/0015031. This game apparatus is comprised of two infrared light sources in the vicinity of a display screen, and a wireless game controller. The game controller includes an imaging element, and an image processing circuit electrically connected to the imaging element. The imaging element is configured for capturing images of the two infrared light sources. The image processing circuit is configured for processing the images to calculate positions of the game controller, thus obtaining information on three-dimensional motions of the game controller. The game controller can be used in various simulated games. However, in this game apparatus, at least two infrared light sources must be provided. This means the game apparatus has a somewhat complex structure.

Therefore, a handheld controller and a game apparatus using the same are needed to overcome the above-described shortcomings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Various embodiments will now be described in detail below with reference to the drawings.

Figure 1:
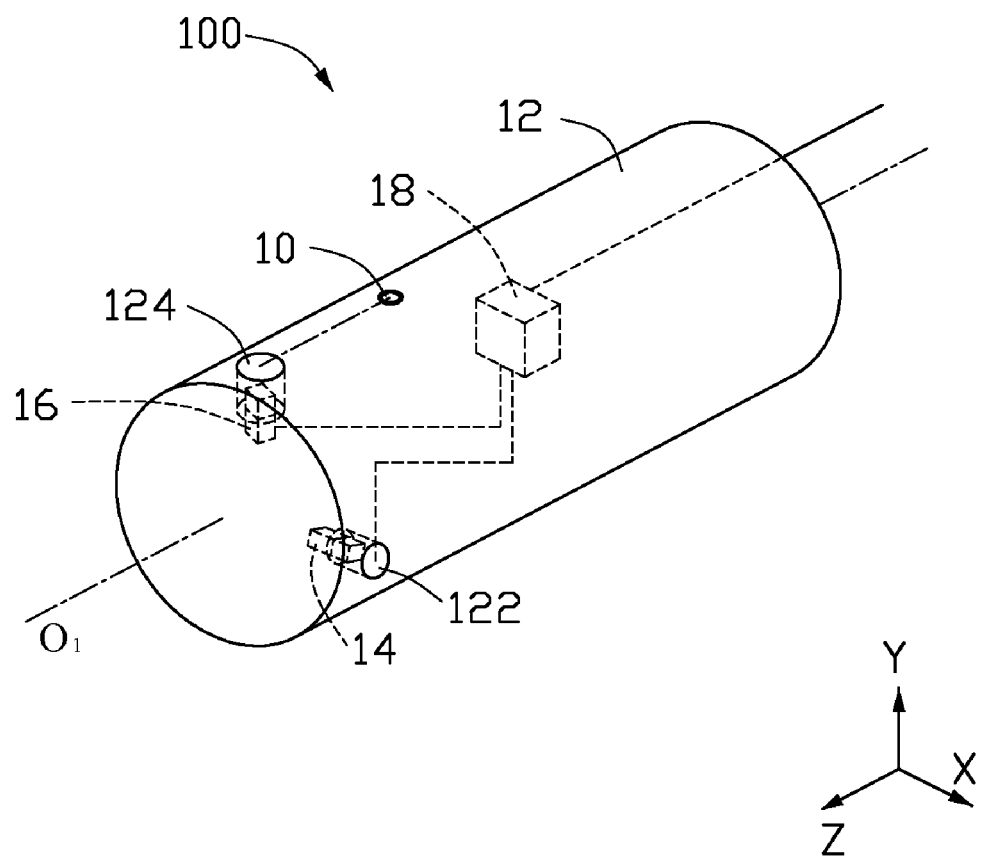
FIG. 1 is an isometric view of a handheld controller in accordance with a first exemplary embodiment.

Referring to FIG. 1, a handheld controller 100 according to a first exemplary embodiment includes a columnar shell 12, a first gas pressure detecting member 14, a second gas pressure detecting member 16, and a processing unit 18.

In the present embodiment, the columnar shell 12 has a cylindrical shape with a central axis $O_1$. The columnar shell 12 has a proper diameter convenient for gripping by a user.

The columnar shell 12 defines a first receiving recess 122 and a second receiving recess 124 in a sidewall thereof. The first and second receiving recesses 122, 124 each extend along a radial direction of the columnar shell 12. That is, the first and second receiving recesses 122, 124 each extend toward and are perpendicular to the central axis $O_1$. The first and second receiving recesses 122 and 124 are perpendicular to each other. An X-Y-Z coordinate system is shown in FIG. 1. In this illustrated embodiment, the first receiving recess 122 extends parallel with an X axis, the second receiving recess 124 extends parallel with a Y axis, and the central axis $O_1$ of the columnar shell 12 is parallel with a Z axis. In this embodiment, the first and second receiving recesses 122, 124 are substantially cylindrical. It is to be understood that the first and second receiving recesses 122 and 124 can instead be substantially prism-shaped.

The first and second gas pressure detecting members 14, 16 are configured for detecting air pressure in the first and second receiving recesses 122, 124, respectively, such air pressure corresponding to air pressure exerted by ambient air at the outside of the columnar shell 12; and further configured for generating signals relating to the detected air pressures. In certain embodiments, the first and second gas pressure detecting members 14 and 16 can be gas-pressure sensors or pressure transducers. The first gas pressure detecting member 14 is received in the first receiving recess 122, and faces outward from the first receiving recess 122. The second gas pressure detecting member 16 is received in the second receiving recess 124, and faces outward from the second receiving recess 124. In the present embodiment, the first and second gas pressure detecting members 14 and 16 are located in inmost areas of the first and second receiving recesses 122, 124, respectively. That is, the first gas pressure detecting member 14 is inwardly spaced from an outer opening of the first receiving recess 122. Similarly, the second gas pressure detecting member 16 is inwardly spaced from an outer opening of the second receiving recess 124.

Figure 5:
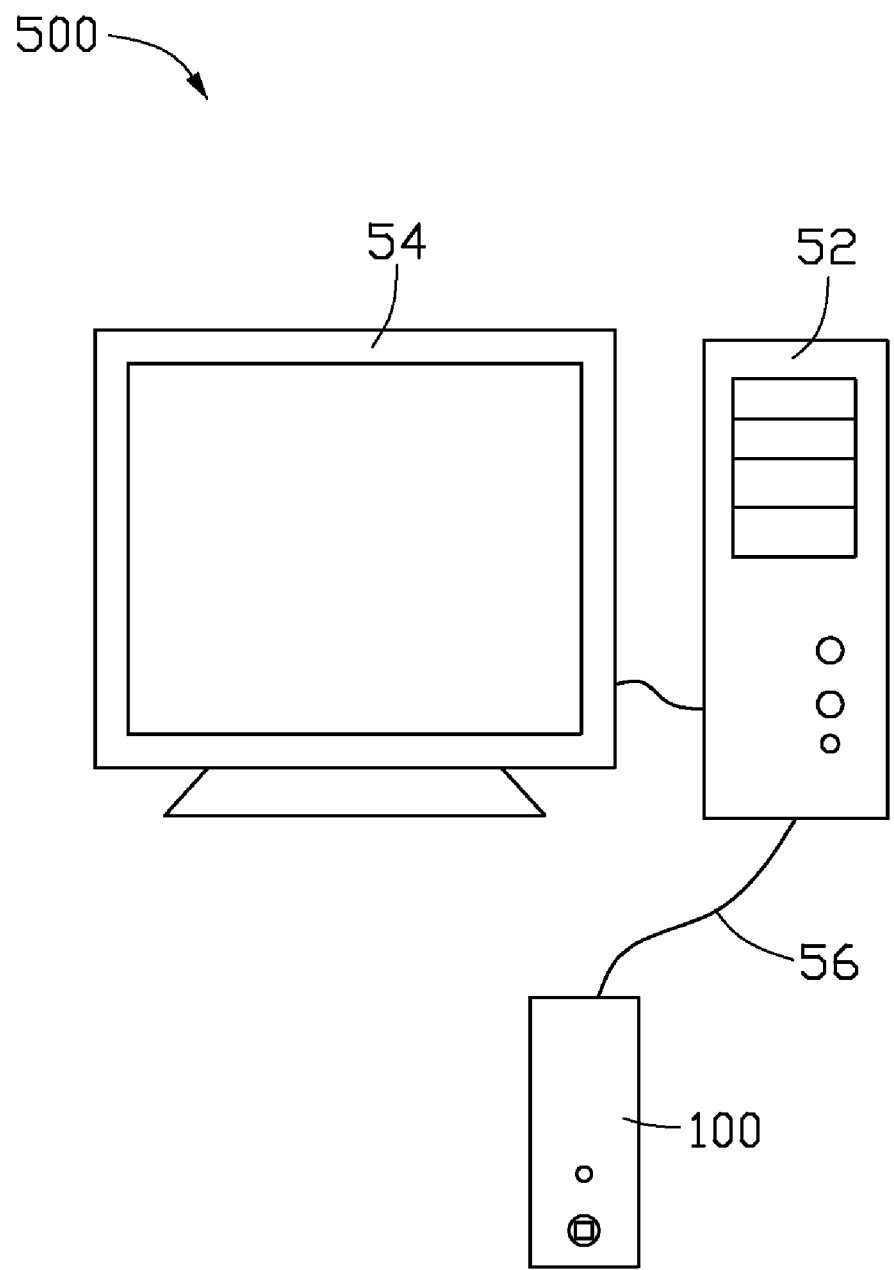
FIG. 5 is an isometric view of a game apparatus in accordance with a fifth exemplary embodiment.

The processing unit 18 is installed in the columnar shell 12, and is electrically connected with the first and second gas pressure detecting members 14, 16. The processing unit 18 is configured for receiving and processing the signals relating to the detected air pressure from the first and second gas pressure detecting members 14, 16, and generating instructions that are sent to an electronic device (e.g. a player host (computer) 52, as shown in FIG. 5). It is to be understood that the processing unit 18 can instead be installed in the electronic device.

The hand held controller 100 further includes a marker 10. The marker 10 can be a small protrusion, a small recess, or a dot with a different color from the columnar shell 12. The marker 10 is arranged on the sidewall of the columnar shell 12. The marker 10 and the second receiving recess 124 are aligned along a direction (not labeled) that is parallel with the central axis $O_1$. With the marker 10, the first and second receiving recesses 122 and 124 can be easily distinguished. In an alternative embodiment, the marker 10 can be a switch button of the handheld controller 100, thereby simplifying a structure of the handheld controller 100.

A process for controlling an electronic device using the handheld controller 100 is described in detail as follows:

Firstly, the handheld controller 100 is kept still. The first gas pressure detecting member 14 detects air pressure, thereby reading a first pressure value. The second gas pressure detecting member 16 detects air pressure, thereby reading a second pressure value. The first and second pressure values are defined as reference pressure values. The reference pressure values are transmitted to the processing unit 18.

The handheld controller 100 is then swung along a certain direction, such as along the X axis, by a user. When the handheld controller 100 moves along the X axis, the air in the first receiving recess 122 flows, and thereby the air pressure in the first receiving recess 122 increases. At this moment, the first gas pressure detecting member 14 detects the air pressure as a third pressure value. Because the moving direction of the handheld controller 100 is perpendicular to the Y axis, the air pressure in the second receiving recess 124 is substantially the same as the reference pressure value of the first gas pressure detecting member 122. Signals representing the air pressures detected by the first and second gas pressure detecting members 122, 124 are transmitted to the processing unit 18 in real time.

When the third air pressure value is larger than a predetermined (or threshold or critical) value, the processing unit 18 processes the corresponding air pressure signal, generates an instruction, and transmits the instruction to an electronic device, for example the player host 52. For instance, when the user is playing a drum-striking game, and the columnar shell 12 is swung along the X axis to cause the third air pressure value to exceed the critical value, the processing unit 18 generates an instruction of striking the drum with a drumstick and playing the sound of a drumbeat. In addition, different air pressures can correspond to different volumes of the drumbeat. That is, swinging the columnar shell 12 at different speeds can cause the drumbeat to have different volumes. In another example, in a fighting game, swinging the columnar shell 12 along the X direction corresponds to a left straight punch of a character, and swinging the columnar shell 12 along the Y direction corresponds to a right straight punch of the character. In this game, different swinging speeds can correspond to different powers of the straight punches.

It is to be understood that in some alternative embodiments, the handheld controller 100 can instead have only one receiving recess 122 or 124, and only one corresponding gas pressure detecting member 14 or 16. In this case, the handheld controller 100 can be applied in some simple games. In further or alternative embodiments, swinging the handheld controller 100 can correspond to an instruction of turning on and/or turning off the electronic device.

In this embodiment, instructions are generated just by swinging the handheld controller 100. Thus, operations of the handheld controller 100 are very simple. In addition, there is no need to use cameras. Thus, the structure and configuration of the handheld controller 100 are simple.

Figure 2:
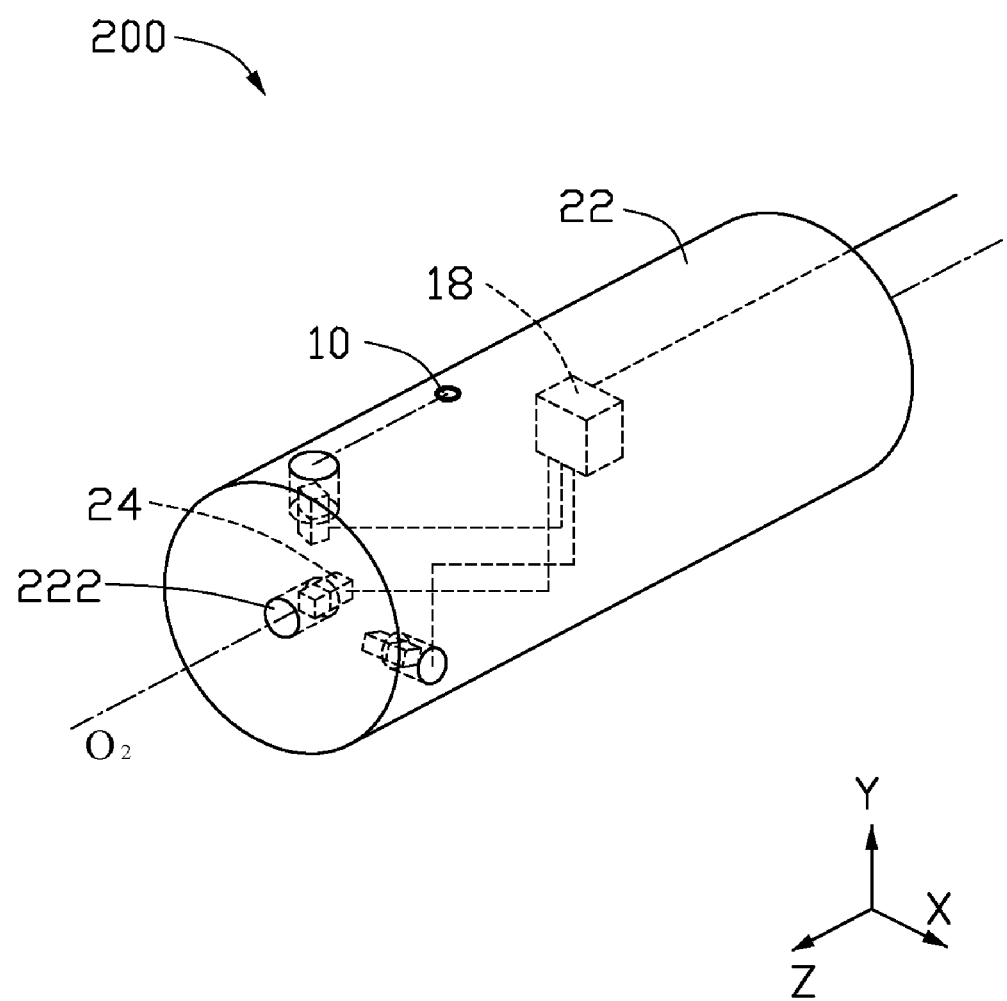
FIG. 2 is an isometric view of a handheld controller in accordance with a second exemplary embodiment.

Referring to FIG. 2, this shows a handheld controller 200 of a second exemplary embodiment. The handheld controller 200 differs from the handheld controller 200 as follows. The handheld controller 200 further includes a third gas pressure detecting member 24. A columnar shell 22 of the handheld controller 200 defines a third receiving recess 222 in an end wall thereof. The third receiving recess 222 extends parallel with the Z axis. In the illustrated embodiment, the third receiving recess 222 is coaxial with a central axis $O_2$ of the columnar shell 22. The third gas pressure detecting member 24 is received in the third receiving recess 222, and faces outward from the third receiving recess 222. In the present embodiment, the third gas pressure detecting member 24 is located in an inmost area of the third receiving recess 222. That is, the third gas pressure detecting member 24 is inwardly spaced from an outer opening of the third receiving recess 222. The third gas pressure detecting member 24 is configured for detecting air pressure in the third receiving recess 222, such air pressure corresponding to air pressure exerted by ambient air at the outside of the columnar shell 22; and further configured for generating signals relating to the detected air pressure. A control process using the handheld controller 200 is similar to that of the first exemplary embodiment. For example, in a fighting game, the handheld controller 200 can control motions of a character in three directions.

Figure 3:
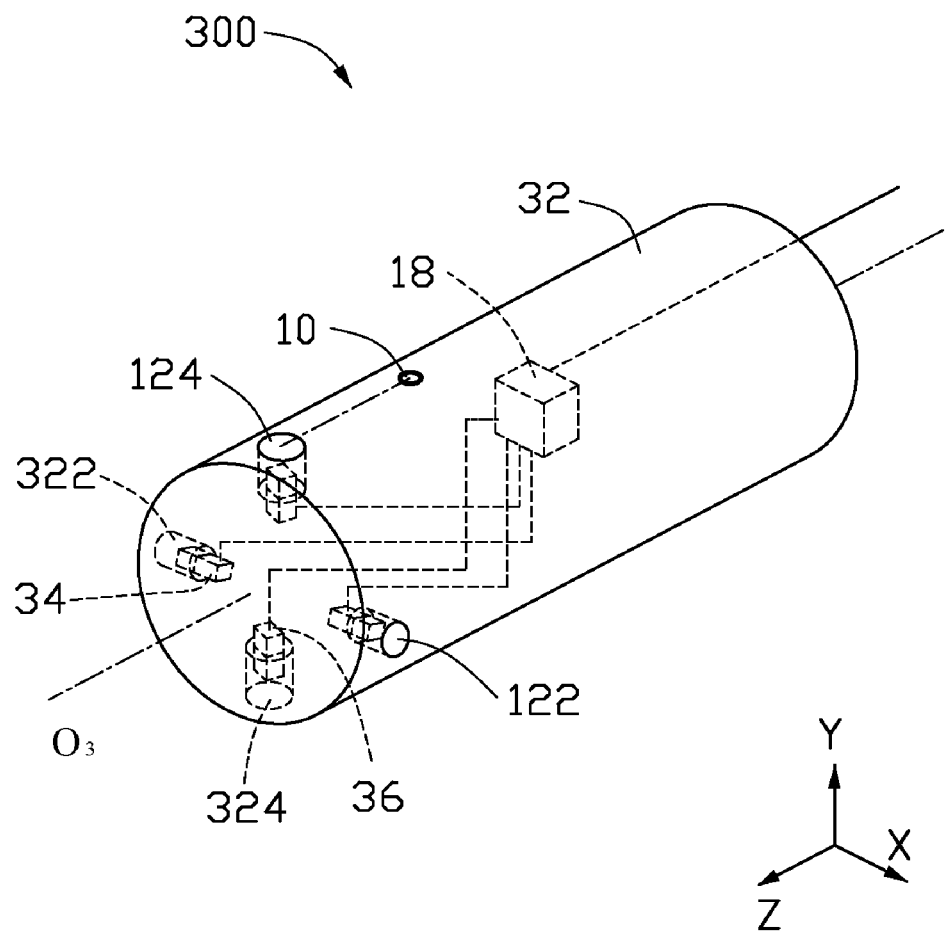
FIG. 3 is an isometric view of a handheld controller in accordance with a third exemplary embodiment.

Referring to FIG. 3, this shows a handheld controller 300 of a third exemplary embodiment. The handheld controller 300 differs from the handheld controller 100 as follows. The handheld controller 300 further includes a third gas pressure detecting member 34 and a fourth gas pressure detecting member 36. A columnar shell 32 of the handheld controller 300 further defines a third receiving recess 322 and a fourth receiving recess 324 in a sidewall thereof. The third receiving recess 322 extends parallel with the X axis and toward a central axis $O_3$ of the columnar shell 32. An opening of the third receiving recess 322 faces away from the first receiving recess 122. In particular, in this exemplary embodiment, the third receiving recess 322 is symmetric relative to the first receiving recess 122 about the central axis $O_3$ of the columnar shell 32. The third gas pressure detecting member 34 is received in the third receiving recess 322, and faces outward from the third receiving recess 322. The third gas pressure detecting member 34 is configured for detecting air pressure in the third receiving recess 322, such air pressure corresponding to air pressure exerted by ambient air at the outside of the columnar shell 32; and further configured for generating signals relating to the detected air pressure. The fourth receiving recess 324 extends parallel with the Y axis and toward a central axis $O_3$ of the columnar shell 32. An opening of the fourth receiving recess 324 faces away from the second receiving recess 124. In particular, in this exemplary embodiment, the fourth receiving recess 324 is symmetric relative to the second receiving recess 124 about the central axis $O_3$ of the columnar shell 32. The fourth gas pressure detecting member 36 is received in the fourth receiving recess 324, and faces outward from the fourth receiving recess 324. The fourth gas pressure detecting member 36 is configured for detecting air pressure in the fourth receiving recess 324, such air pressure corresponding to air pressure exerted by ambient air at the outside of the columnar shell 32; and further configured for generating signals relating to the detected air pressure. In the present embodiment, the third and fourth gas pressure detecting members 34 and 36 are located in inmost areas of the third and fourth receiving recesses 322, 324, respectively. That is, the third gas pressure detecting member 34 is inwardly spaced from an outer opening of the third receiving recess 322. Similarly, the fourth gas pressure detecting member 36 is inwardly spaced from an outer opening of the fourth receiving recess 324. A control process using the handheld controller 300 is similar to that of the first exemplary embodiment.

Figure 4:
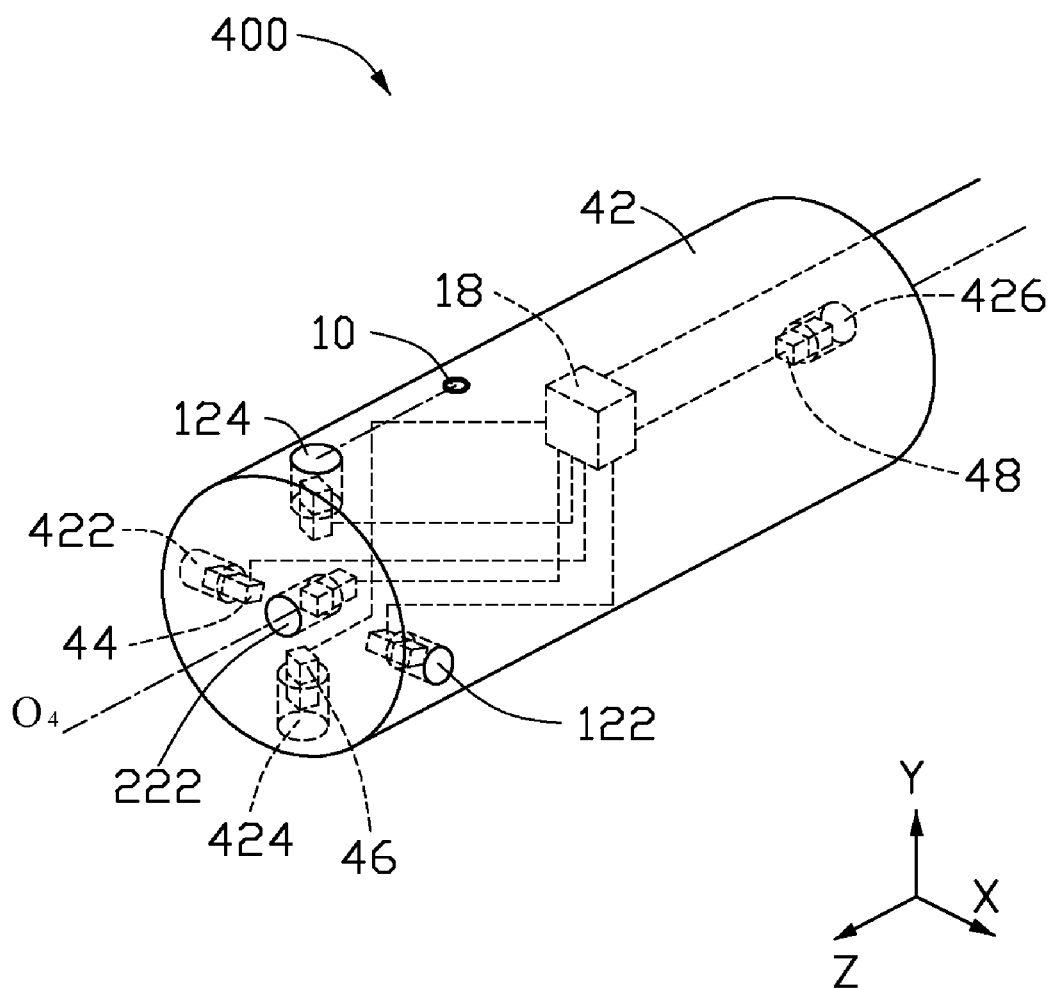
FIG. 4 is an isometric view of a handheld controller in accordance with a fourth exemplary embodiment.

Referring to FIG. 4, this shows a handheld controller 400 of a fourth exemplary embodiment. The handheld controller 400 differs from the handheld controller 200 of the second exemplary embodiment as follows. The handheld controller 400 further includes a fourth gas pressure detecting member 44, a fifth gas pressure detecting member 46, and a sixth gas pressure detecting member 48. A columnar shell 42 of the handheld controller 400 defines fourth and fifth receiving recesses 422, 424 in a sidewall thereof, and a sixth receiving recess 426 in an end wall thereof farthest from the third receiving recess 222. The fourth receiving recess 422 extends parallel with the X axis and toward a central axis $O4$ of the columnar shell 42. An opening of the fourth receiving recess 422 faces away from the first receiving recess 122. In particular, in this exemplary embodiment, the fourth receiving recess 422 is symmetric relative to the first receiving recess 122 about the central axis $O_4$ of the columnar shell 42. The fourth gas pressure detecting member 44 is received in the fourth receiving recess 422, and faces outward from the fourth receiving recess 422. The fourth gas pressure detecting member 44 is configured for detecting air pressure in the fourth receiving recess 422, such air pressure corresponding to air pressure exerted by ambient air at the outside of the columnar shell 42; and further configured for generating signals relating to the detected air pressure. The fifth receiving recess 424 extends parallel with the Y axis and toward the central axis $O_4$ of the columnar shell 42. An opening of the fifth receiving recess 424 faces away from the second receiving recess 124. In particular, in this exemplary embodiment, the fifth receiving recess 424 is symmetric relative to the second receiving recess 124 about the central axis $O_4$ of the columnar shell 42. The fifth gas pressure detecting member 46 is received in the fifth receiving recess 424, and faces outward from the fifth receiving recess 424. The fifth gas pressure detecting member 46 is configured for detecting air pressure in the fifth receiving recess 424, such air pressure corresponding to air pressure exerted by ambient air at the outside of the columnar shell 42; and further configured for generating signals relating to the detected air pressure. The sixth receiving recess 426 extends parallel with the Z axis. The sixth gas pressure detecting member 48 is received in the sixth receiving recess 426, and faces outward from the sixth receiving recess 426. The sixth gas pressure detecting member 48 is configured for detecting air pressure in the sixth receiving recess 426, such air pressure corresponding to air pressure exerted by ambient air at the outside of the columnar shell 42; and further configured for generating signals relating to the detected air pressure. In the present embodiment, the fourth, fifth, and sixth gas pressure detecting members 44, 46, 48 are located in inmost areas of the fourth, fifth, and sixth receiving recesses 422, 424, 426, respectively. That is, the fourth gas pressure detecting member 44 is inwardly spaced from an outer opening of the fourth receiving recess 422. Similarly, the fifth gas pressure detecting member 46 is inwardly spaced from an outer opening of the fifth receiving recess 424. Similarly, the sixth gas pressure detecting member 48 is inwardly spaced from an outer opening of the sixth receiving recess 426. A control process using the handheld controller 400 is similar to that of the first exemplary embodiment.

Referring to FIG. 5, this shows a game apparatus 500 using the handheld controller 100. The game apparatus 500 includes a handheld controller 100 as described in the first exemplary embodiment, a player host 52, and a display screen 54. The player host 52 is electrically connected with the processing unit 18 of the handheld controller 100 using a data wire 56. In this embodiment, the player host 52 is a personal computer. The player host 52 can generate instructions by swinging the handheld controller 100. It is to be understood that the handheld controller 100 in this embodiment can be replaced by the handheld controllers 200, 300, or 400. In addition, the processing unit 18 can instead be received in the player host 52.

Finally, it is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:
1. A handheld controller, comprising:
a shell defining a first receiving recess, a second receiving recess, a third receiving recess and a fourth receiving recess in a sidewall thereof, and a fifth receiving recess and a sixth receiving recess in other sidewalls thereof, the first receiving recess extending along a first direction, the second receiving recess extending along a second direction substantially perpendicular to the first direction, the third receiving recess extending parallel with the first direction and facing away from the first receiving recess, the fourth receiving recess extending parallel with the second direction and facing away from the second receiving recess, the fifth and sixth receiving recesses extending a third directions both perpendicular to the first and second directions and facing away from each other;
a first gas pressure detecting member received in the first receiving recess and facing outward from the first receiving recess, the first gas pressure detecting member configured for detecting first pressures exerted by ambient air at the outside of the shell, and generating first signals relating to the first pressures, the first signals comprising a signal relating to a first reference pressure value of the first gas pressure detecting member when the shell is still and signals relating to pressure values of the first gas pressure detecting member when the shell is moving;
a second gas pressure detecting member received in the second receiving recess and facing outward from the second receiving recess, the second gas pressure detecting member configured for detecting second pressures exerted by ambient air at the outside of the shell, and generating second signals relating to the second pressures, the second signals comprising a signal relating to a second reference pressure value of the second gas pressure detecting member when the shell is still and signals relating to pressure values of the second gas pressure detecting member when the shell is moving;
a third gas pressure detecting member received in the third receiving recess and facing outward from the third receiving recess, the third gas pressure detecting member configured for detecting third air pressures exerted by ambient air at the outside of the shell, and generating third signals relating to the third pressures;
a fourth gas pressure detecting member received in the fourth receiving recess and facing outward from the fourth receiving recess, the fourth gas pressure detecting member configured for detecting fourth pressures exerted by ambient air at the outside of the shell, and fourth generating signals relating to the fourth pressures;
a fifth gas pressure detecting member received in the fifth receiving recess, the fifth gas pressure detecting member configured for detecting fifth pressures exerted by ambient air at the outside of the shell, and generating fifth signals relating to the fifth pressures;
a sixth gas pressure detecting member received in the sixth receiving recess, the sixth gas pressure detecting member configured for detecting sixth pressures exerted by ambient air at the outside of the shell, and generating sixth signals relating to the sixth pressures; and
a processing unit located within the shell and electrically connected with the first pressure detecting member, the second gas pressure detecting member, the third gas pressure detecting member, the fourth gas pressure detecting member, the fifth gas pressure detecting member and the sixth gas pressure detecting member, the processing unit configured for receiving the first signals, the second signals, the third signals, the fourth signals, the fifth signals and the sixth signals, identifying a movement of the shell according to the first, second, third, fourth, fifth and sixth signals, and generating an instruction based on the identified movement.

* * * * *